United States Patent Office 2,886,532
Patented May 12, 1959

2,886,532

HYDROGEN PEROXIDE EMULSIONS

Kenneth William Richmond, Hale, and Brian Hughes, Sale, England, assignors to Shell Development Company, New York, N.Y., a corporation of Delaware No Drawing. Application May 28, 1956
Serial No. 587,504

10 Claims. (Cl. 252—104)

This invention relates to emulsions of aqueous hydrogen peroxides in organic media. It deals with novel emulsions of this type having improved stability.

Emulsions of aqueous hydrogen peroxide have been extensively used for brightening or bleaching fabrics during the dry cleaning process. However, the emulsions which have hitherto been used have been prepared in the non-aromatic dry-cleaning solvents employed, i.e. white spirits and trichloroethylene, and have had only a low degree of stability. As a result it has been necessary to make up the emulsions just prior to their addition to the dry-cleaning solvent and use in the cleaning operation. This is not only quite inconvenient for the operator of the dry cleaning establishment but also tends to lead to variations in successive batches of emulsions which result in ununiform brightening and/or waste of hydrogen peroxide.

An important object of the present invention is to provide stable emulsions of hydrogen peroxide which avoid the foregoing difficulties. Another object is the provision of emulsions of aqueous hydrogen peroxide which are sufficiently stable so that they can be safely shipped, stored and used as required. Still another object is the production of emulsions of aqueous hydrogen peroxide which not only have a high degree of emulsion stability but also have improved stability against hydrogen peroxide decomposition. A further object is the provision of an advantageous method for the preparation of aqueous hydrogen peroxide emulsions having these desirable characteristics. Still other objects and advantages of the invention will be apparent from the following description and illustrative examples of these new compositions and methods of operation.

It has now been found that emulsions of aqueous hydrogen peroxide having the foregoing advantageous properties, namely a high degree of stability against separation and settling of the phases of the emulsion as well as against loss of hydrogen peroxide content, and other desirable characteristics, can be prepared by using as the organic phase of the emulsion certain liquid aromatic hydrocarbons or liquid aromatic hydrocarbon fractions boiling within the range of 100° to 300° C. in combination with a non-ionic surface-active agent which is soluble in said aromatic hydrocarbons as the emulsifying agent.

The new emulsions of the invention consist essentially of an emulsion of aqueous hydrogen peroxide in liquid aromatic hydrocarbon which contains no unsaturated aliphatic groups, boils within the range 100° to 300° C. and is substantially free from readily polymerizable bodies, together with a non-ionic, surface-active agent in solution therein.

The new emulsions of the invention can be produced by mixing together an aqueous solution of hydrogen peroxide, a liquid aromatic hydrocarbon or fraction of aromatic hydrocarbons which meets the foregoing essential requirements and a non-ionic surface-active agent which is soluble in the hydrocarbon medium. An especially advantageous method of producing the new emulsions in accordance with one modification of the invention comprises first dissolving the non-ionic surface-active agent which is to be employed as emulsifying agent for the composition in the aromatic hydrocarbon medium and then adding the aqueous hydrogen peroxide to the resulting solution while agitating the mixture to effect an intimate mixing of the phases and produce a uniform, fine dispersion. Stirring of the mixture in a mechanical stirrer is usually sufficient to produce the desired dispersion. Heating of the hydrocarbon is sometimes useful for facilitating more rapid solution of the non-ionic emulsifying agent. In some cases standing for several hours after the introduction of the aqueous hydrogen peroxide with agitation the initial emulsion clarifies and stable, clear, liquid emulsion is obtained.

Aqueous hydrogen peroxide solutions of any desired strength can be successfully incorporated in the emulsions of the invention. Thus relatively weak solutions containing 2.75%, weight by weight basis, of hydrogen peroxide (a 10-volume solution) or less, or more concentrated solutions containing, for example, 35%, weight by weight, hydrogen peroxide (130-volume solutions) or higher concentrations of hydrogen peroxide, e.g. 85%, weight by weight, or higher, can be used. The aqueous hydrogen peroxide solutions employed may advantageously contain one or more stabilizers of hydrogen peroxide of which many are known. Suitable stabilizers are, for example, small amounts, usually of the order of about 0.1 to 1 mole percent of the hydrogen peroxide, of sodium or magnesium silicate, sodium stannate, magnesium chloride, potassium pyrophosphate, "Versene" (ethylene diamine tetraacetic acid) and the like or mixtures thereof.

The liquid aromatic hydrocarbon which is used in the new emulsions can, as previously indicated, be any liquid aromatic hydrocarbon which is free from unsaturated aliphatic groups and boils within the range 100° to 300° C. Suitable aromatic hydrocarbons of this type include, for example, toluene, the xylenes, preferably the ortho and meta isomers because of their lower melting points, cumene, tertiary butyl benzene, cymene, alpha-methyl naphthalene, durene, octylbenzene, para-phenyl toluene, ditolylethane, and the like. Instead of individual compounds, mixtures thereof can be used. Fractions of liquid aromatic hydrocarbons such as are obtained by distillation of the products of petroleum cracking and/or aromatization processes, e.g. the Catarole process described in "Petroleum Times," October 12, 1946, page 1078, or of coal tar, are advantageous. Solvent extraction of aromatic-rich fractions of petroleum and dehydrogenation of naphthene fractions followed by isolation of the aromatic hydrocarbons produced are other suitable sources of aromatic hydrocarbon fractions boiling between 100° and 300° C. which can be used in the new emulsions.

When the fraction contains readily polymerizable bodies such as indene or styrene, these are removed, e.g. by polymerization in known fashion and separation of the polymeric products formed. The residual liquid fractions which may be used in making the emulsions of the invention may still contain unsaturated hydrocarbons in relatively low amounts, i.e. in amounts of up to 10% by weight. Preferably the aromatic hydrocarbon fractions used do not contain more than 6% by weight of unsaturated hydrocarbons.

According to a less advantageous modification of the invention the emulsifying medium may comprise a mixture of the aromatic hydrocarbon or aromatic hydrocarbon fraction referred to and a non-aromatic hydrocarbon solvent such as white spirit, in which the non-aromatic hydrocarbon constitutes up to 50% by weight of the mixture.

The non-ionic surface-active agent which is the essential emulsifying agent in the new emulsions can be of a variety of different types. As previously pointed out, they must, however, be soluble in the liquid aromatic hydrocarbon or hydrocarbon fraction employed as dispersing medium. Non-ionic emulsifying agents which have been found to be especially useful are the condensates of alkylene oxides with fatty alcohols or esters. Polyalkylene glycol monoethers having from about 4 to about 8 oxyalkylene groups, preferably oxyethylene and/or oxypropylene groups, and a hydrocarbon chain, preferably an alkyl chain of about 10 to 20 carbon atoms, are particularly advantageous. Thus condensates of oleyl alcohol or cetyl alcohol or oleyl-cetyl alcohol mixtures with from 5 to 7 molecules of ethylene oxide have been found to be very satisfactory for the purpose of the invention. The monoesters of fatty acids such as stearic, lauric, myristic and palmitic with polyethylene glycols having an average molecular weight of about 300 to about 400 are another advantageous subgroup of non-ionic emulsifying agents of which the monostearate of polyethylene glycol of average molecular weight 380–420 has been found particularly satisfactory.

Other types of useful non-ionic emulsifying agents include glycerol and polyglycerol monoesters and monoethers having a hydrocarbon group of 10 to 20 carbon atoms in the molecule such, for instance, as glycerol monostearate, diglycerol monostearate, glycerol monooleate, glycerol monocetyl ether, secondary alkyl glycerol ethers having about 10 to 20 carbon atoms in the alkyl group such as 2-pentadecyl-alpha-glycerol monoether, etc., alkyl aryl ethers of glycerol having an alkyl group of 8 to 18 carbon atoms as dodecylphenyl glycerol monoether, and the like. Mixtures of two or more non-ionic emulsifying agents can be used instead of the individual compounds.

The amount of aqueous hydrogen peroxide which it is desirable to incorporate in the emulsions of the invention depends on the strength of the aqueous hydrogen peroxide solution used but quantities of up to about 50% by weight can be incorporated, although with highly concentrated aqueous hydrogen peroxide solutions of about 75% by weight hydrogen peroxide content or greater it is most advantageous to use not more than about 30% in the final emulsion. The most favorable proportions of ingredients in the new emulsions are:

| | Percent by weight |
|---|---|
| Emulsifying medium (aromatic hydrocarbon-containing phase) | 30 to 50 |
| Non-ionic emulsifying agent | 15 to 45 |
| Aqueous hydrogen peroxide | 55 to 5 |

The following examples illustrate the new emulsions in accordance with the invention. In each case the emulsion was prepared by dissolving the non-ionic surface-active or emulsifying agent in the emulsifying medium with stirring, and heating up to about 50° C. when required to promote solution, followed by mixing the aqueous hydrogen peroxide into the solution with agitation. The aromatic hydrocarbons used were derived from the products of the Catarole cracking and aromatization process applied to a petroleum charging stock and consisted essentially of aromatic hydrocarbons of the indicated boiling ranges having no unsaturated aliphatic groups which were free from readily polymerizable compounds.

*Example I*

| | Parts by weight |
|---|---|
| Aqueous hydrogen peroxide, 35% w./w. | 40 |
| Aromatic hydrocarbon fraction of boiling range 200 to 210° C. | 40 |
| Oleyl cetyl alcohol-ethylene oxide condensate (6.5 moles ethylene oxide per mole alcohol) | 20 |

*Example II*

| | Parts by weight |
|---|---|
| Aqueous hydrogen peroxide, 2.75% w./w. | 40 |
| Aromatic hydrocarbon fraction of boiling range 200 to 210° C. | 40 |
| Oleyl cetyl alcohol-ethylene oxide condensate (6.5 moles ethylene oxide per mole alcohol) | 20 |

*Example III*

| | |
|---|---|
| Aqueous hydrogen peroxide, 27.5% w./w. | 40 |
| Aromatic hydrocarbon fraction of boiling range 150 to 190° C. | 40 |
| Cetyl alcohol-ethylene oxide condensate (6.2 moles ethylene oxide per mole of alcohol) | 20 |

*Example IV*

| | |
|---|---|
| Aqueous hydrogen peroxide, 75% w./w. | 15 |
| Aromatic hydrocarbon fraction of boiling range 200 to 210° C. | 50 |
| Oleyl alcohol-ethylene oxide condensate (6.5 moles ethylene oxide per mole of alcohol) | 35 |

*Example V*

| | |
|---|---|
| Aqueous hydrogen peroxide, 27.5% w./w. | 40 |
| Aromatic hydrocarbon fraction of boiling range 100 to 140° C. | 20 |
| White spirit | 20 |
| Polyethylene glycol, average molecular weight 400, monostearate | 20 |

*Example VI*

| | |
|---|---|
| Aqueous hydrogen peroxide, 35% w./w. | 40 |
| Aromatic hydrocarbon fraction of boiling range 200 to 260° C. | 30 |
| White spirit | 10 |
| Oleyl alcohol-ethylene oxide condensate (6 moles ethylene oxide per mole of alcohol) | 20 |

*Example VII*

| | |
|---|---|
| Aqueous hydrogen peroxide, 85% w./w. | 10 |
| Aromatic hydrocarbon fraction of boiling range 200 to 210° C. | 50 |
| Oleyl alcohol-ethylene oxide condensate (6.5 moles ethylene oxide per mole of alcohol) | 40 |

*Example VIII*

| | |
|---|---|
| Aqueous hydrogen peroxide, 35% w./w. | 40 |
| Aromatic hydrocarbon fraction of boiling range 200 to 290° C. | 40 |
| Oleyl alcohol-ethylene oxide condensate (6.5 moles ethylene oxide per mole of alcohol) | 20 |

In all cases stable, clear, liquid emulsions were obtained within a few hours. They all showed satisfactory stability on storage, the hydrogen peroxide content being in the order of 71% of its original strength after five months' shelf storage at which time there was no indication of phase separation. A sample of the emulsion of Example III stored for 18 months contained 66% of the original hydrogen peroxide and showed only slight breaking of the emulsion. Similar good results are obtained by using aromatic fractions of the same boiling ranges derived from coal tar in the emulsions of the foregoing examples. These results are in contrast to the hydrogen peroxide emulsions available prior to the invention which generally broke on standing for only short periods and had to be prepared shortly or immediately before application in order to be used successfully. The new aqueous hydrogen peroxide emulsions are readily dispersible in the usual dry cleaning solvents. After shipment and/or storage in concentrated form they can be thus diluted and used in the dry cleaning process where they give excellent brightening and bleaching of textiles. They are also useful in many other applications.

It will thus be seen that the invention offers substantial advantages over prior methods and is capable of considerable variation, so it will be understood that no limitation to the examples, which have been given by way of illustration only, is intended.

We claim as our invention:

1. A hydrogen peroxide emulsion of the water-in-oil type consisting essentially of aqueous hydrogen peroxide, liquid aromatic hydrocarbons having no unsaturated aliphatic groups in the molecule boiling within the range 100° to 300° C. and substantially free from readily polymerizable compounds, and non-ionic surface-active emulsifying agent in solution therein, the proportions being about 30 to 50% by weight of aromatic hydrocarbon-containing phase, about 15 to 45% by weight of non-ionic emulsifying agent, and about 55% to 5% by weight of aqueous hydrogen peroxide.

2. A hydrogen peroxide emulsion in accordance with claim 1 wherein the hydrocarbon phase of the emulsion consists essentially of a liquid aromatic hydrocarbon fraction containing in solution said non-ionic surface-active emulsifying agent.

3. A hydrogen peroxide emulsion in accordance with claim 1 wherein the aqueous hydrogen peroxide is dispersed in an aromatic hydrocarbon fraction derived from a petroleum cracking and aromatization process.

4. An emulsion of aqueous hydrogen peroxide in a liquid hydrocarbon substantially free from readily polymerizable compounds consisting essentially of liquid aromatic hydrocarbon containing no unsaturated aliphatic groups boiling within the range 100° to 300° C. and not more than an equal weight of non-aromatic hydrocarbon solvent together with a non-ionic, surface-active emulsifying agent in solution therein, the proportions being about 30 to 50% by weight of aromatic hydrocarbon-containing phase, about 15 to 45% by weight of non-ionic emulsifying agent, and about 55% to 5% by weight of aqueous hydrogen peroxide.

5. An emulsion in accordance with claim 4 wherein the non-aromatic hydrocarbon solvent is white spirit.

6. A hydrogen peroxide emulsion consisting essentially of about 5% to 55% by weight of aqueous hydrogen peroxide solution, about 50 to 30% of liquid hydrocarbon substantially free from readily polymerizable compounds consisting essentially of liquid aromatic hydrocarbon containing no unsaturated aliphatic groups boiling within the range 100° to 300° C. and not more than an equal weight of non-aromatic hydrocarbon solvent, and about 45 to 15% of a non-ionic, surface-active emulsifier.

7. A hydrogen peroxide emulsion in accordance with claim 6 wherein the non-ionic emulsifier is a monoether of a higher fatty alcohol of 10 to 20 carbon atoms per molecule and a polyalkylene glycol having about 4 to about 8 alkylene groups containing 2 to 3 carbon atoms each per molecule.

8. A hydrogen peroxide emulsion in accordance with claim 7 wherein the non-ionic emulsifier is a fatty alcohol-ethylene oxide condensate.

9. A hydrogen peroxide emulsion consisting of about 30 to 50% by weight of liquid aromatic hydrocarbon free from unsaturated aliphatic groups boiling within the range 100° to 300° C., and 15 to 45% by weight of monoester of a polyhydric alcohol having a hydrocarbon group of 10 to 20 carbon atoms in the molecule, the remainder being aqueous hydrogen peroxide.

10. A process for producing a stable emulsion of aqueous hydrogen peroxide which comprises dissolving a non-ionic, surface-active emulsifying agent in a liquid aromatic hydrocarbon fraction boiling within the range 100° to 300° C. and substantially free from readily polymerizable compounds in an amount of 50% to 90% of emulsifying agent based on the weight of said hydrocarbon, and admixing the resulting solution with aqueous hydrogen peroxide of about 2 to about 90% concentration to form a dispersion consisting essentially of about 15 to 45% by weight of said non-ionic emulsifying agent, said hydrocarbon, and about 5 to about 55% by weight of aqueous hydrogen peroxide.

References Cited in the file of this patent

UNITED STATES PATENTS

| 2,371,545 | Riggs et al. | Mar. 13, 1945 |
| 2,402,373 | Cordero | June 18, 1946 |
| 2,565,403 | Sproule et al. | Aug. 21, 1951 |
| 2,803,565 | Sagar | Sept. 8, 1955 |

FOREIGN PATENTS

| 68,540 | Austria | Sept. 25, 1915 |
| 23,346 | Denmark | Aug. 5, 1918 |

OTHER REFERENCES

Practical Emulsions, by Bennett, page 272, pub. by Chemical Pub. Co., Inc., Brooklyn (1943).

Surface Active Agents, by Schwartz et al., pp. 203, 216, pub. by Interscience Pub. Inc., New York (1949).

Chemical Formulary, by Bennett, vol. IX, pages 534–537, pub. by Chemical Pub. Co., Inc., Brooklyn (1951).